UNITED STATES PATENT OFFICE.

MAGOTARO MAKINO, OF SAN FRANCISCO, CALIFORNIA.

SOY-BEAN FOOD.

1,258,427.     Specification of Letters Patent.     Patented Mar. 5, 1918.

No Drawing.     Application filed December 5, 1916. Serial No. 135,168.

*To all whom it may concern:*

Be it known that I, MAGOTARO MAKINO, a subject of the Emperor of Japan, residing at the city and county of San Francisco and State of California, have invented new and useful Improvement in Soy-Bean Food, of which the following is a specification.

My invention relates to the preparation of an edible food from what is known as the soy bean (*Glycine Soja*). This vegetable contains protein and fat in large quantities; and it is the object of my invention to subject this material to a process which will render it suitable for the preparation of food.

The soy bean contains a large quantity of water and oil, and in its normal condition cannot be properly reduced and prepared for food.

This invention consists in a process by which the substance is brought to such a condition that it may be prepared into a palatable food.

For this preparation the beans are first crushed by suitable machinery and ground into flour, after which the bran and refuse are separated from the flour in any suitable manner. To manufacture the "bean cheese" the material is mixed with sufficient cold water to form a paste. To this is added cold water in proportion sufficient to thin the mass, and the solution may then be leached for an hour or two. It is then poured into boiling water and thoroughly stirred. When it has boiled and is ready to run out of the pan, a small proportion of sweet or salad oil is added and the boiling continued until the foaming subsides. The edible oil has the effect of destroying the peculiar odor and flavor of the beans and gives the final product a very much better flavor; it also greatly increases the softness of the cheese and betters its condition for future use.

The mass is then placed in a deep vessel and a covering of thin sheet linen is placed over it. The boiling liquid is placed in a cloth bag and is squeezed until the thick liquid is forced through, care being taken not to drop any sediment into the strained material.

A solution of Epsom salts is then prepared, about one-eighth of a pound in a pint of water, giving a bitter flavor. This solution is then gradually spread over the mass until a white deposit begins to show. After a short time this will separate entirely from the mass, leaving a light yellow liquid on the top. When the separation is entirely complete the water is poured off and the white solid material is placed in a cloth and subjected to pressure until the water has all run out. When the residue has become solid, it may be placed in cold water and is then ready for use. This residue which contains mainly protein, starch, and fat is then ready for cooking and other purposes.

Having thus described my invention, what I claim and desire to secure by Letters Patent is—

1. The process of preparing a food product, which comprises first crushing soy beans to a flour, mixing the product with water and heating it, adding a small proportion of edible oil, filtering the resulting mixture, precipitating the proteins in the filtrate, and separating them from the bulk of the remaining liquid.

2. The process of preparing a food product, which comprises first crushing soy beans to a flour, mixing the product with water and boiling it, adding a small proportion of edible oil, filtering the resulting mixture, adding a proportion of Epsom salts to produce a precipitate, and separating the precipitate from the remaining liquid.

3. The process of preparing a food product from soy beans, which comprises first crushing the beans and then removing the flour from the crushed mass, leaching the flour, boiling the flour with water and with a sweet or salad oil, filtering the solution, adding Epsom salts to cause a whitish deposit and finally compressing this deposit to remove therefrom further quantities of liquid.

4. As an article of manufacture, a product rich in proteins from soy beans and obtainable by pulverizing soy beans, leaching the pulverized product and then heating it with water and ultimately with an edible oil, filtering, causing the proteins in the filtrate along with some fat and oil to separate from the bulk of the water, and then compressing the separated protein material to remove further quantities of liquid.

In testimony whereof I have hereunto set my hand in the presence of two subscribing witnesses.

MAGOTARO MAKINO.

Witnesses:
JOHN H. HERRING,
W. W. HEALEY.